(No Model.) 2 Sheets—Sheet 1.
W. W. LOWMAN.
FERTILIZER DISTRIBUTER.
No. 358,744. Patented Mar. 1, 1887.
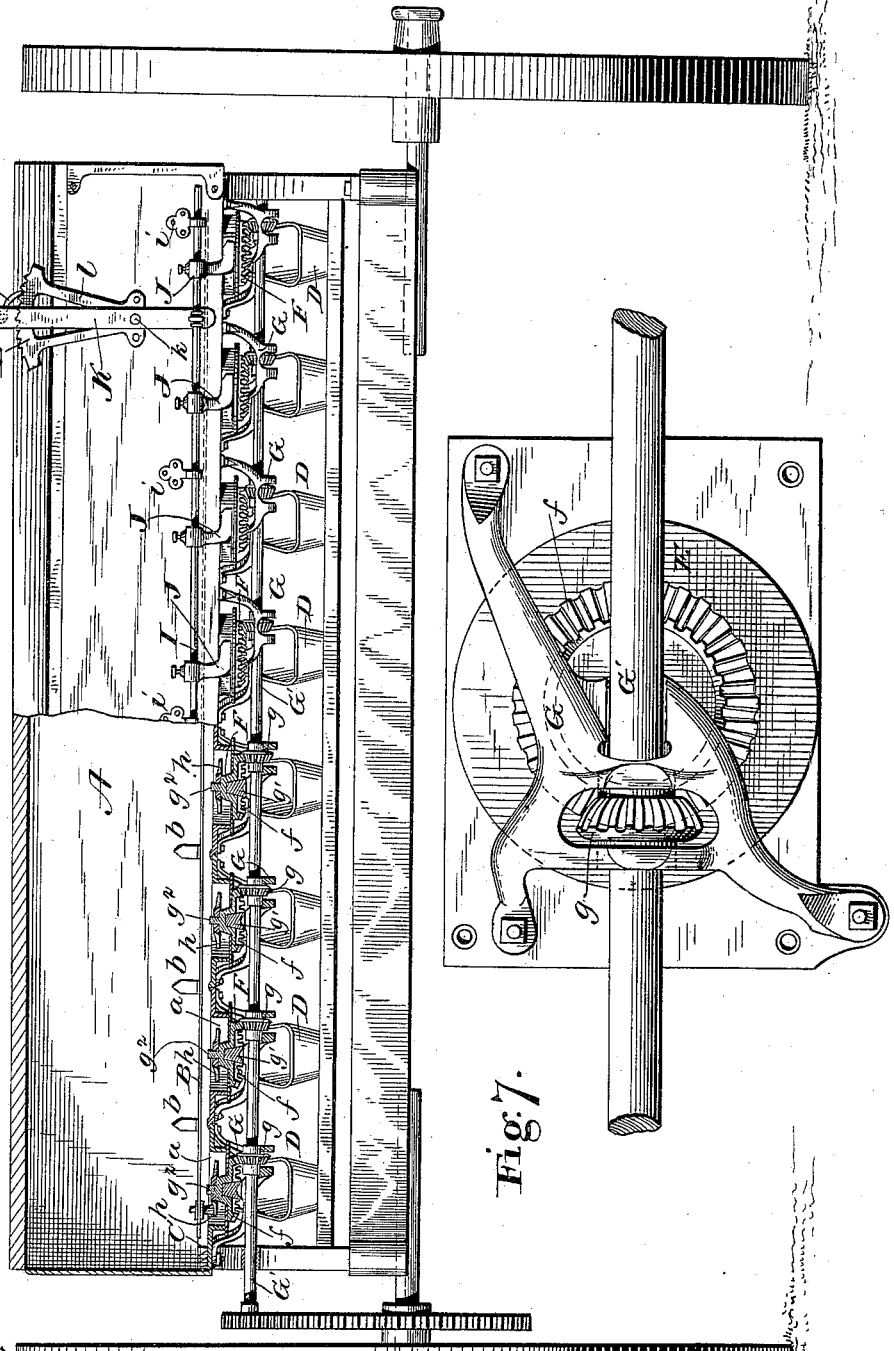

(No Model.) 2 Sheets—Sheet 2.
W. W. LOWMAN.
FERTILIZER DISTRIBUTER.
No. 358,744. Patented Mar. 1, 1887.
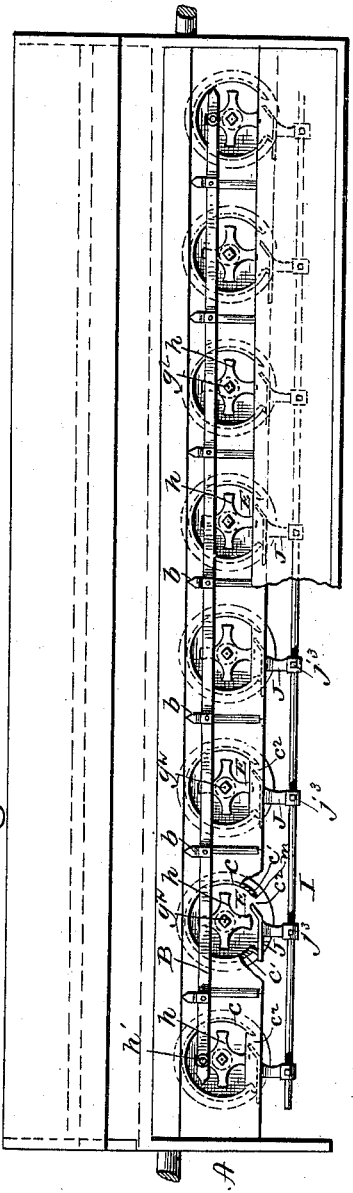
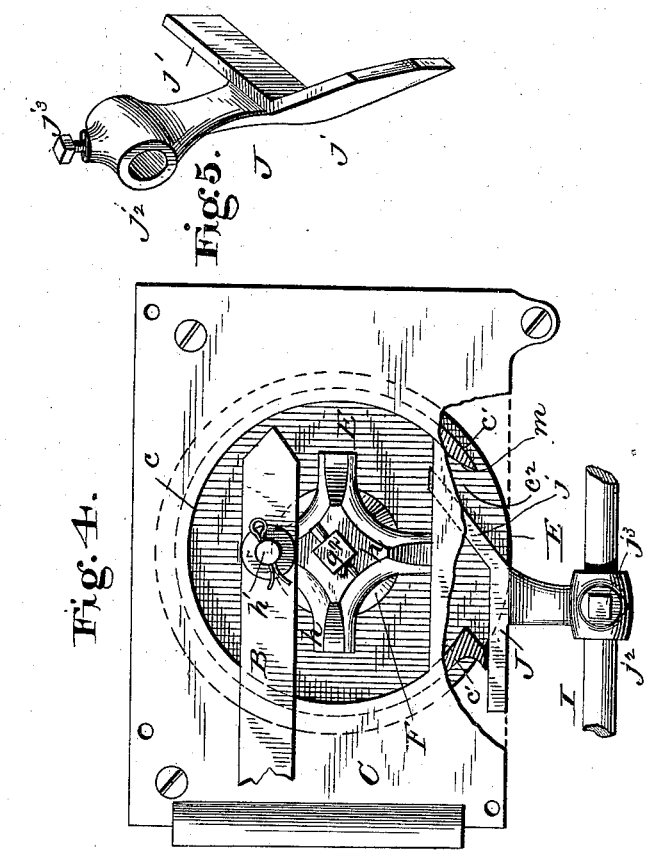
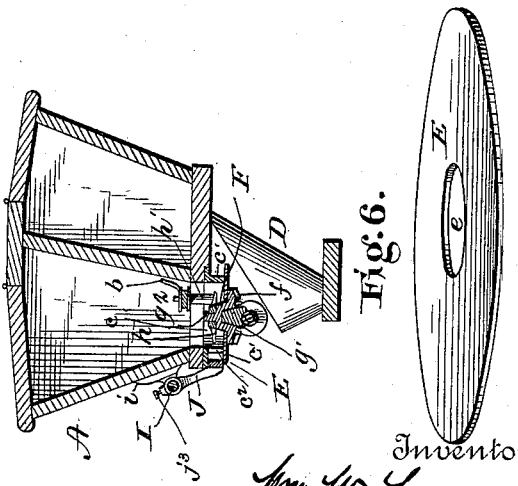
Witnesses
F. L. Ourand,
Rex. Smith
Inventor
Wm W. Lowman
By his Attorney A. M. Smith

UNITED STATES PATENT OFFICE.

WILLIAM W. LOWMAN, OF GREENCASTLE, PENNSYLVANIA, ASSIGNOR TO THE CROWELL MANUFACTURING COMPANY, OF SAME PLACE.

FERTILIZER-DISTRIBUTER.

SPECIFICATION forming part of Letters Patent No. 358,744, dated March 1, 1887.

Application filed November 27, 1886. Serial No. 220,019. (No model.)

*To all whom it may concern:*

Be it known that I, WILLIAM W. LOWMAN, of Greencastle, county of Franklin, and State of Pennsylvania, have invented a new and useful Improvement in Fertilizer-Distributers, of which the following is a full, clear, and exact description, reference being had to the accompanying drawings, making part of this specification.

My invention relates to machines for distributing fertilizing material; and the object is to produce a machine in which all arching or bridging of the fertilizing material in the hopper shall be avoided, and which shall thoroughly loosen the material before discharging the same, and also in which the amount of material discharged shall be easily regulated.

A further object of my invention is to provide the hoppers of this class of machines with a reversible and non-corrodible disk for feeding the material.

To the above purposes my invention consists, first, in the provision of a longitudinally-sliding bar carrying angular gates for varying the area of the discharge-openings of the feeding-hopper, and in the combination therewith of a lever for operating said rod and gates; secondly, in the provision of a non-corrodible disk located in the bottom of the hopper, and detachably and reversibly connected with the actuating-gear for feeding the material; and, finally, in certain peculiar and novel features of construction and arrangement, as hereinafter described and claimed.

In order that my invention may be fully understood, I will proceed to describe it with reference to the accompanying drawings, in which—

Figure 1 is a rear elevation, partly in section, of a fertilizer-distributer constructed in accordance with my invention. Fig. 2 is a plan view, partly broken away, illustrating the feeding-hopper with the distributing and discharge regulating devices applied thereto. Fig. 3 is a transverse vertical section of the hopper with the feeding and discharging devices applied thereto. Fig. 4 is a plan view, partly broken away, of the feeding and discharging devices detached from the hopper. Fig. 5 is a detached view in perspective illustrating the form of the gates. Fig. 6 is a detached view of the reversible disk. Fig. 7 is an inverted plan view of the feeding and discharging devices detached from the hopper.

In the said drawings, A designates the feeding-hopper, which is provided with a series of openings, $a$, in its bottom, through which the fertilizer is fed to the discharging devices hereinafter described.

B designates a bar which extends longitudinally along the bottom of the hopper A and immediately above the discharge-openings $a$ thereof. This bar carries a series of angular upwardly-extending fingers, $b$, which serve to agitate the mass of material within the hopper, and thus prevent all arching or bridging of the same, as hereinafter more particularly described.

C designates a series of plates, which are secured beneath the bottom of the hopper, immediately beneath the openings $a$ thereof, and each of which is formed with a circular opening, $c$, which registers with the corresponding opening, $a$, in the bottom of the hopper. On the under side of each of these plates C is formed a circular downwardly-extending flange, $c'$, the rear side of which has an opening, $c^2$, through which the fertilizing material is discharged into the conductors D. Immediately beneath each of these circular flanges $c'$ is placed a disk, E, which is made of galvanized iron or other metal, which will be non-corrodible under the action of the fertilizing material. Each of these disks is formed with a circular central opening, $e$, to receive a central conical plate, F, the under side of which is formed with a circular gear-rim, $f$.

G designates a bracket, which is secured to the under side of the plate C, and which depends downwardly therefrom, (see Fig. 7,) and has formed at its lower portion a bearing for the feeding-shaft G'. This shaft extends longitudinally beneath the hopper, and carries a series of beveled gear-pinions, $g$, at the points of bearing of the shaft in said brackets, as best shown in Fig. 7, and which mesh with the gear-rims of the conical plate F. The brackets G are also formed with a stud, $g'$, which extends upward into a central cavity beneath the conical plate F, as shown. Upon the upper portion of each of the plates F is formed a stud, $g^2$, which is square or polyangular in form, and upon which is keyed a casting, $h$, having several radial arms, as shown, which serve as the castings revolve to force the fertilizing material outward through the discharge-openings into the conductors. One of the arms of each of the end castings is provided with an upwardly-extending stud, $h'$, which studs enter openings in the bar B, before referred to, the arrangement being such that as the castings revolve a circular reciprocating motion shall be imparted to the bar B, for the purpose of breaking up the fertilizing material in the hopper by means of the fingers $b$, as above mentioned.

I designates a bar or rod, which extends longitudinally along the rear of the hopper, and which is guided by a series of loops, $i$, secured to the rear side of the hopper, as shown. Upon this bar or rod are secured a series of gates, J, the lower ends of which are V-shaped, as shown at $j\ j'$ in Fig. 5, the upper end of the gate being formed with a sleeve, $j^2$, to receive the rod I, and having a binding-screw, $j^3$, or other similar device by which the gate is properly secured to the rod.

K designates a hand-lever, pivoted at $k$, upon the rear of the hopper, and connected at its lower end to the rod I in such manner that when said lever is vibrated laterally a longitudinal sliding movement shall be imparted to the rod I, for the purpose of varying the position of the arms $j$ of the gates within the discharge-openings before referred to. At its upper end the lever K carries a pawl, $k'$, which engages the teeth of a segmental rack, L, formed upon a quadrant frame or bracket, $l$, which is secured to the rear side of the hopper in front of the hand-lever, said pawl serving, by its engagement with the teeth of the rack L, to retain the lever in any desired position of adjustment.

The operation of the machine is as follows: As the machine is drawn over the ground rotary movement is applied to the feeding-shaft through suitable connections with the carrying-wheel, and a rotary movement is applied by said shaft through the beveled pinions and gear-rims to the stirrers, which force the material outward through the discharge-openings.

By reference to Fig. 4 it will be seen that one end of the flange $c'$ is beveled off, as shown at $m$, and the arm $j'$ of the gate is so inclined that the opening $c^2$ is made larger at its outer part than at its inner part, whereby the discharge of the material is facilitated and all choking of the discharge-opening is avoided, and whereby, also, the closing of the gates is rendered free and unobstructed.

Having thus described my invention, what I claim as new, and desire to secure by Letters Patent, is—

1. In a fertilizer-distributer, a reversible detachable disk formed of non-corrodible material, and located adjacent to the discharge-opening of the hopper, substantially as described.

2. The combination, with the feeding-hopper and its discharge-opening, of the sliding angular gate extending through the feed-aperture, and suitable connections upon the outer side of the hopper for adjusting the same for varying the area of the discharge-opening, substantially as set forth.

3. The combination, with the feeding-hopper and its discharge-opening, of the plate C, secured beneath the hopper, and having the opening $c$, the disk E, having the central opening, $e$, the conical plate F, having gear-rim $f$, and the bracket G, having stud $g'$, for sustaining said conical plate, and secured to the plate C, substantially as set forth.

4. The combination, with the feeders or stirrers $h$ at the ends of the hopper, of the studs $h'$, one upon one arm of each of said end stirrers, and the bar B, connected to said studs, substantially as and for the purpose specified.

5. The combination, with the plate C, having the circular flange $c'$, beveled off, as at $m$, and the disk E, of the gate J, having the arms $j\ j'$, inclined relatively to each other and operating to vary the area of the discharge-opening, and the rod or bar I, to which said gate is secured, substantially as set forth.

In testimony whereof I have hereunto set my hand this 26th day of November, A. D. 1886.

WILLIAM W. LOWMAN.

Witnesses:
BENJAMIN F. WINGER,
JACOB DEARDORFF.